US009099044B2

(12) United States Patent
Kuo et al.

(10) Patent No.: US 9,099,044 B2
(45) Date of Patent: Aug. 4, 2015

(54) APPARATUS AND METHOD FOR DRIVING LIGHT EMITTING DIODE

(75) Inventors: Chun-Ting Kuo, Pingtung County (TW); Chun-Fu Lin, Taoyuan County (TW); Cheng-Han Hsieh, Hsinchu County (TW)

(73) Assignee: MY-SEMI Inc., Hsinchu (TW)

( * ) Notice: Subject to any disclaimer, the term of this patent is extended or adjusted under 35 U.S.C. 154(b) by 635 days.

(21) Appl. No.: 12/897,794

(22) Filed: Oct. 5, 2010

(65) Prior Publication Data

US 2011/0234579 A1 Sep. 29, 2011

(30) Foreign Application Priority Data

Mar. 26, 2010 (TW) ............................... 99109062 A

(51) Int. Cl.
*G06F 3/038* (2013.01)
*G09G 3/34* (2006.01)

(52) U.S. Cl.
CPC ...................................... *G09G 3/342* (2013.01)

(58) Field of Classification Search
USPC ........... 345/30, 39, 77, 79, 82, 102, 204, 208, 345/1.1; 327/23, 108
See application file for complete search history.

(56) References Cited

U.S. PATENT DOCUMENTS

| | | | | |
|---|---|---|---|---|
| 7,511,695 | B2 * | 3/2009 | Furukawa et al. | 345/102 |
| 7,768,216 | B2 * | 8/2010 | Pauritsch | 315/360 |
| 7,847,765 | B2 * | 12/2010 | Park et al. | 345/82 |
| 8,174,487 | B2 * | 5/2012 | Furukawa et al. | 345/102 |
| 8,362,999 | B2 * | 1/2013 | Huang et al. | 345/100 |
| 2010/0001944 | A1 * | 1/2010 | Seong et al. | 345/102 |
| 2010/0073639 | A1 * | 3/2010 | Shibasaki | 353/31 |
| 2010/0156467 | A1 * | 6/2010 | Sun et al. | 326/96 |
| 2010/0238203 | A1 * | 9/2010 | Stroemer et al. | 345/690 |
| 2011/0031895 | A1 * | 2/2011 | Liu et al. | 315/294 |
| 2011/0156604 | A1 * | 6/2011 | Kuo et al. | 315/185 R |
| 2011/0175935 | A1 * | 7/2011 | S et al. | 345/690 |
| 2012/0026019 | A1 * | 2/2012 | Lin et al. | 341/50 |

* cited by examiner

*Primary Examiner* — Gerald Johnson
*Assistant Examiner* — Robert Michaud
(74) *Attorney, Agent, or Firm* — Min-Lee Teng; Litron Patent & Trademark Office

(57) ABSTRACT

A driving apparatus for driving at least one first light emitting diode unit and a second light emitting diode unit includes a data transmitting unit and a driving unit. The data transmitting unit is used for receiving and storing driving data. The driving data includes first data corresponding to a first driving signal and second data corresponding to a second driving signal. The driving unit divides the first driving signal into a plurality of first sub-driving signals and the second driving signal into a plurality of second sub-driving signals, and then alternately outputs the first sub-driving signals and the second sub-driving signals to alternately drive the first light emitting diode unit and the second light emitting diode unit.

15 Claims, 9 Drawing Sheets

APPARATUS AND METHOD FOR DRIVING LIGHT EMITTING DIODE

CROSS-REFERENCE TO RELATED APPLICATION

This application claims the priority benefit of Taiwan application serial no. 99109062, filed on Mar. 26, 2010. The entirety of the above-mentioned patent application is hereby incorporated by reference herein and made a part of this specification.

BACKGROUND OF THE INVENTION

1. Field of the Invention

The present invention relates to a driving apparatus for a light emitting diode, and more particularly, to a driving apparatus which can increase the refresh rate in a scan application.

2. Description of Related Art

Because light emitting diodes (LED) are small in size, power-saving and durable and their prices are getting lower with maturing of fabrication thereof, products that have LEDs as a light source have been widespreadly used in recent years. The LEDs are widely used in various terminal devices ranging from automobile headlamps, traffic lights, text displays, bulletin boards and large-sized video displays, to ordinary and construction illumination and LCD backlighting applications.

A typical LED display mainly includes an array of LEDs. A pixel of the image consists of red (R), green (G) and blue (B) portions. Each portion can consist of one or more LEDs. In displaying the image, adjusting the brightness of the red, blue, and green of the pixels can result in different colors. Image refresh rate refers to the rate of refreshing images on the screen. Image refresh cycle is the reciprocal of the image refresh rate, which indicates the time an image stays. To reduce the cost of the displays, the number of the driving circuits used can be significantly reduced by increasing the LED driving current in combination with the use of a scan technology. Because the LEDs are current-driven devices which are limited by the current driving capacity and transforming capacity of the LED driving circuits, the image refresh rate cannot be effectively increased.

SUMMARY OF THE INVENTION

Accordingly, the present invention is directed to apparatus and method for driving an LED, adapted for driving a plurality of LED units in a scan application and increasing the image refresh rate of an LED display by dividing the scanning cycles.

The present invention provides a driving apparatus for driving at least one first light emitting diode unit and a second light emitting diode unit. The driving apparatus includes a data transmitting unit and a driving unit. The data transmitting unit is used for receiving and storing driving data. The driving data includes first data corresponding to a first driving signal and second data corresponding to a second driving signal. The driving unit is coupled to the data transmitting unit to drive the first light emitting diode unit according to the first driving data and drive the second light emitting diode unit according to the second driving data. The driving unit divides the first driving signal into a plurality of first sub-driving signals and the second driving signal into a plurality of second sub-driving signals, and then alternately outputs the first sub-driving signals and the second sub-driving signals to alternately drive the first light emitting diode unit and the second light emitting diode unit.

In one embodiment of the present invention, the driving unit divides an image refresh cycle into a plurality of first sub-refresh cycles and a plurality of second sub-refresh cycles that are alternately arranged, and the driving unit respectively outputs the first sub-driving signals during the first sub-refresh cycles and respectively outputs the second sub-driving signals during the second sub-refresh cycles. The first sub-refresh cycles are not arranged adjacent to each other, and the second sub-refresh cycles are not arranged adjacent to each other.

In one embodiment of the present invention, the driving unit includes a first storage unit and a second storage unit. The first storage unit is coupled to the data transmitting unit for storage of the first data. The second storage unit is coupled to the data transmitting unit for storage of the second data.

In one embodiment of the present invention, the driving unit further includes a selecting circuit, a pulse density modulation unit, an output unit, and a counting unit. The selecting circuit is coupled to the first storage unit and the second storage unit for selectively outputting the first data or the second data. The pulse density modulation unit is coupled to the output of the selecting circuit for generating a plurality of first sub-duty cycles and second sub-duty cycles according to the output of the selecting circuit and a counting signal. The output unit is coupled to the pulse density modulation unit for generating the first sub-driving signals and the second sub-driving signals according to first sub-duty cycles and second sub-duty cycles. The counting unit is coupled to the pulse density modulation for outputting the counting signal.

In one embodiment of the present invention, the driving unit further includes a first pulse density modulation unit, a second pulse density modulation unit, a selecting unit, and a counting unit. The first pulse density modulation unit is coupled to the first storage unit for outputting a plurality of first sub-duty cycles according to the first data and a first counting signal. The second pulse density modulation unit is coupled to the second storage unit for outputting a plurality of second sub-duty cycles according to the second data and a second counting signal. The selecting unit is coupled to the first pulse density modulation unit and the second pulse density modulation unit for selectively outputting the first sub-duty cycles or the second sub-duty cycles. The output unit is coupled to the selecting unit for generating the first sub-driving signals according to the first sub-duty cycles and generating the second sub-driving signals according to the second sub-duty cycles. The counting unit is coupled to the first pulse density modulation unit and the second pulse density modulation unit for outputting the first counting signal and the second counting signal, respectively.

In one embodiment of the present invention, the driving apparatus further includes a first switch, a second switch, and a controller. The first switch is coupled between one end of the first light emitting diode unit and an operating voltage. The second switch is coupled between one end of the second light emitting diode unit and the operating voltage. The controller is coupled to the first switch, the second switch, the data transmitting unit and the driving unit for controlling turn-on/off of the first switch and the second switch. In addition, the first switch and second switch can be disposed at any suitable positions in the circuit depending upon different circuit architecture. For example, the first switch and the second switch may also be disposed between the light emitting diode unit and the driving circuit to control turn-on/off of the light emitting diode unit.

In one embodiment of the present invention, the driving unit outputs a black insertion signal between each adjacent first and second sub-driving signals.

In one embodiment of the present invention, the first light emitting diode unit and the second light emitting unit includes one or more light emitting diodes connected in series, respectively. The data transmitting unit and the driving unit are integrated into one driving circuit.

In another aspect, the present invention provides a driving method adapted for driving at least one first light emitting diode unit and one second light emitting diode unit. The driving method comprises: receiving and storing driving data, the driving data comprising first data corresponding to a first driving signal and second data corresponding to a second driving signal; dividing the first driving signal into a plurality of first sub-driving signals, dividing the second driving signal into a plurality of second sub-driving signals; and alternately outputting the first sub-driving signals and the sub-driving signals to alternately drive the first light emitting diode unit and the second light emitting diode unit.

In one embodiment of the present invention, the driving method further includes dividing an image refresh cycle into a plurality of first sub-refresh cycles and a plurality of second sub-refresh cycles that are alternately arranged, and respectively outputting the first sub-driving signals during the first sub-refresh cycles and respectively outputting the second sub-driving signals during the second sub-refresh cycles.

In view of the foregoing, in the present invention, the driving signals corresponding to different light emitting diode units are divided into a plurality of sub-driving signals which are then alternately outputted in a preset sequence to alternately driving different light emitting diode units. The present invention can be used in a light emitting diode display to increase the image refresh rate of the light emitting diode display.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

First Embodiment

Figure 1A:
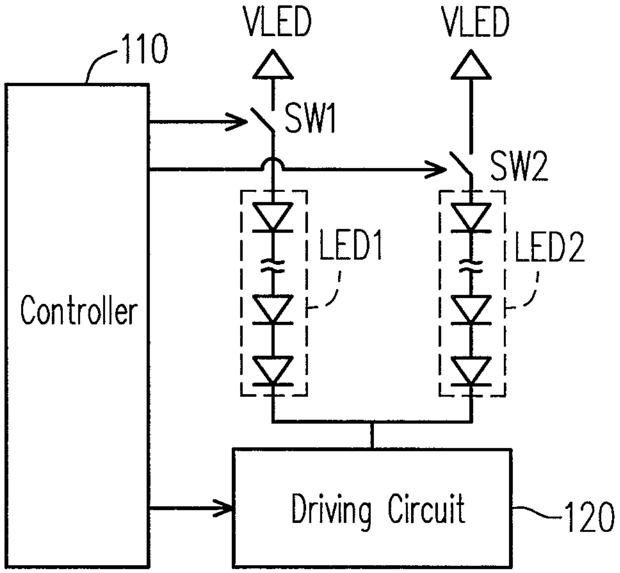
FIG. 1A illustrates a driving apparatus of a light emitting diode according to a first embodiment of the present invention.

FIG. 1A illustrates a driving apparatus of a light emitting diode (LED) according to a first embodiment of the present invention. The driving apparatus includes a controller 110, a driving circuit 120, and switches SW1, SW2. The controller 110 is coupled to the driving circuit 120 for outputting driving data and control signals to the driving circuit 120. The driving circuit 120 is coupled to two LED units LED1, LED2. The switches SW1 and SW2 are coupled between the LED units LED1/LED2 and an operating voltage VLED, respectively. The controller 110 is coupled to the switches SW1 and SW2 for controlling turn-on/off of the switches SW1 and SW2. By controlling turn-on/off of the switches SW1 and SW2, the driving circuit 120 can selectively drive the LED units LED1 and LED2. In other words, the circuit shown in FIG. 1 is a ½ scan circuit architecture, in which one output pin of the driving circuit 120 can drive two LED units LED1 and LED2. The LED unit LED1 and LED2 may be formed by a plurality of LEDs connected in series. However, the present embodiment does not limit the LED units to any particular form. In addition, application of the present embodiment can be extended to ¼ or ⅛ scan circuit architecture. Therefore, the circuit described herein is illustrative and should not be regarded as limiting.

Figure 1B:
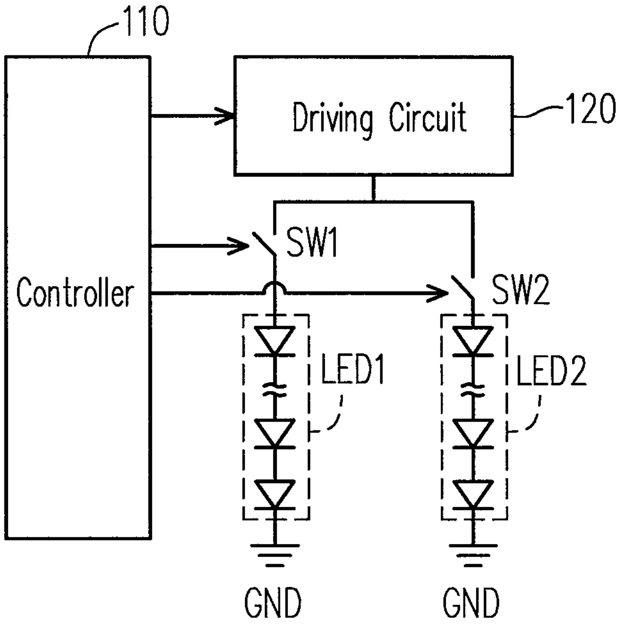
FIG. 1B illustrates a driving apparatus of a light emitting diode according to another embodiment of the present invention.

The driving apparatus of the present embodiment is adapted for various types of LED driving architecture. Referring to FIG. 1B, a driving apparatus of an LED according to another embodiment of the present invention is shown. The main difference between FIG. 1B and FIG. 1A is that they are of different driving types: FIG. 1A is sink-type while FIG. 1B is source-type. In addition, the switches SW1 and SW2 of FIG. 1B are coupled at different positions. The switch SW1 is coupled between the driving circuit 120 and the LED unit LED1, and the other end of the LED unit LED1 is connected to ground GND. The switch SW2 is coupled between the driving circuit 120 and the LED unit LED2, and the other end of the LED unit LED2 is connected to ground GND. The driving apparatus is adapted to both configurations of FIG. 1A and FIG. 1B although they are of different driving types.

Figure 2:
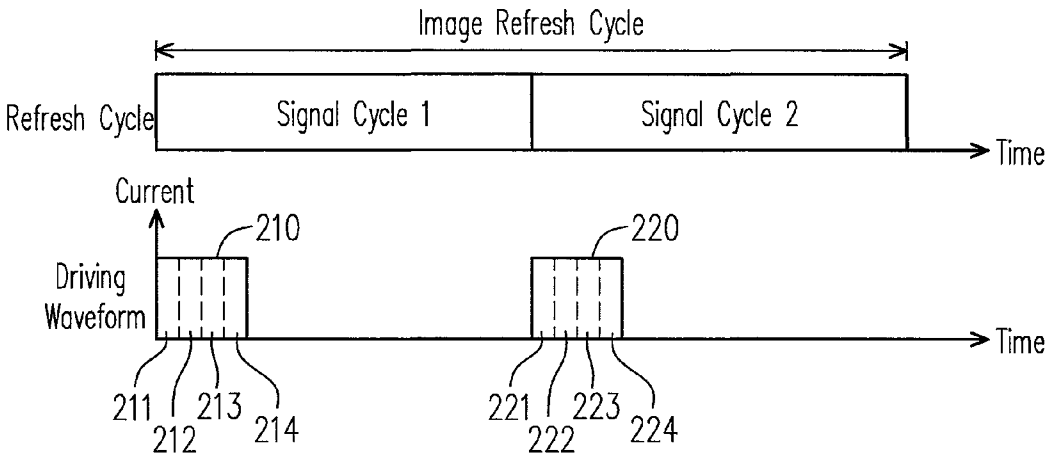
FIG. 2 and FIG. 3 illustrate a driving sequence according to the first embodiment of the present invention.

Next, taking the circuit architecture of FIG. 1A as an example, a driving sequence of the present embodiment is described below. Referring to FIG. 2, a driving sequence of the first embodiment of the present invention is shown. The driving sequence of the driving apparatus shown in FIG. 2 is for a ½ scan application. To achieve a dual-drive effect, one refresh cycle is divided into a signal cycle 1 and a signal cycle 2. The LED unit LED1 is driven during the signal cycle 1 and the LED unit LED2 is driven during the signal cycle 2. For example, referring to the driving waveform of FIG. 2, a driving signal 210 is used to drive the LED unit LED1 and a driving signal 220 is used to drive the LED unit LED2. The driving signal 210 and driving signal 220 are generated by the driving circuit 120, for example, using a pulse width modulation (PWM) unit or a pulse density modulation (PDM) unit which generates the signals according to a PWM signal generated from driving data.

From FIG. 2, it can be seen that the driving circuit 120 can drive both LED units LED1 and LED2 in a time-division manner during one refresh cycle, which can reduce the number of the driving chips. In the present embodiment, in order to increase the refresh rate, the signal cycle 1 and signal cycle 2 are divided into a plurality of sub-refresh cycle 1-1 to 1-4, 2-1 to 2-4, and at the same time, the driving signal 210 and driving signal 220 are divided into a plurality of sub-driving signals 211 to 214, 221 to 224. The sub-refresh cycles 1-1 to 1-4, 2-1 to 2-4 alternately occur in the time sequence and the sub-driving signals 211 to 214, 221 to 224 are outputted during the respective sub-refresh cycles 1-1 to 1-4, 2-1 to 2-4. As such, the sub-driving signals 211 to 214, 221 to 224 are outputted alternately to alternately drive the LED units LED1, LED2 thus increasing the refresh rate. The controller 110 turns the switches SW1, SW2 on or off in accordance with the sub-refresh cycles 1-1 to 1-4, 2-1 to 2-4 such that the driving signals 211 to 214, 221 to 224 alternately drive the LED units LED1, LED2.

Figure 3:
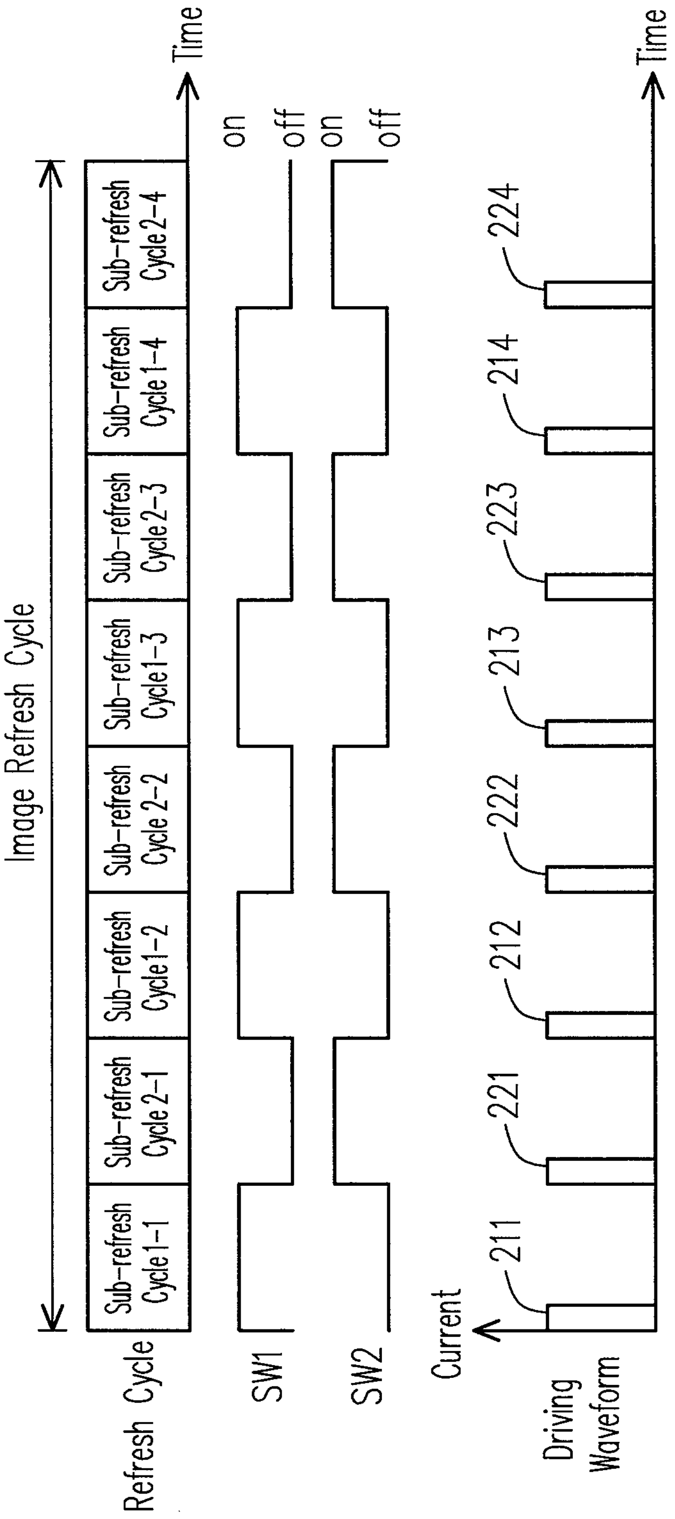

In FIG. 3, the driving circuit 120 divides the signal cycle 1 into four sub-refresh cycles 1-1 to 1-4 and the signal cycle 2 into four sub-refresh cycles 2-1 to 2-4. The sub-refresh cycles 1-1 to 1-4 and the sub-refresh cycles 2-1 to 2-4 alternately occur, and the sub-refresh cycles divided from one same signal cycle are not arranged adjacent to each other. In other words, the sub-refresh cycles 1-1 to 1-4 are not adjacent to each other, and the sub-refresh cycles 2-1 to 2-4 are not adjacent to each other, as shown in FIG. 3. The driving circuit also divides the driving signals 210, 220 into a plurality of sub-driving signals 211 to 214, 221 to 224 to be outputted during the respective sub-refresh cycles 1-1 to 1-4, 2-1 to 2-4. In the present embodiment, taking the driving signals 210, 220 divided into four sub-driving signals 211 to 214, 221 to 224, respectively, as an example, the sub-driving signals 211 to 214 are outputted during the sub-refresh cycles 1-1 to 1-4, respectively, to drive the LED unit LED1, and the sub-driving signals 221 to 224 are outputted during the sub-refresh cycles 2-1 to 2-4, respectively, to drive the LED unit LED2. Because the driving signal 210 is divided into four sub-driving signals, the refresh rate of the LED unit LED1 can be increased by four times as compared to the conventional technology. For the same reason, the refresh rate of the LED unit LED2 can also be increased by four times. Therefore, the image refresh rate of an entire LED display can be increased by four times thus avoiding the image flicker or signal attenuation.

While the driving signal 210 is divided into four sub-driving signals 211 to 214 in the present embodiment, it is noted that this is for the purposes of illustration only and should not be regarded as limiting. Depending upon actual requirements, the driving signal 210 can be divided into different number of sub-driving signals to be outputted during the respective sub-refresh cycles 1-1 to 1-4 to drive the LED unit LED 1. Likewise, the driving signal 220 can also be divided into different number of sub-driving signals to be outputted during the respective sub-refresh cycles 2-1 to 2-4 to drive the LED unit LED2. As long as the sub-driving signals (e.g. 211 to 214, and 221 to 224) divided from the driving signals (e.g. 210 and 220) for different LED units (LED1 and LED2) are alternately outputted, the image refresh rate can be increased. In addition, because of the greater pulse width for the high gray scale driving signal, the high gray scale driving signal can be divided into more sub-driving signals. As long as the sub-driving signals are evenly distributed in respective sub-refresh cycles, the image refresh rate can likewise be increased. Likewise, the number of the sub-refresh cycles is not limited to four. Rather, the refresh cycle can be divided into any more than one number of sub-refresh cycles depending upon actual requirements, which can be readily understood by those skilled in the art upon reading this disclosure and thus is not repeated herein. In addition, in another embodiment of the present invention, one or more sub-driving signals can be outputted during a single sub-refresh cycle. For example, if the number of the sub-driving signals divided from the driving signal 210 is less than or equal to the number of the number of the sub-refresh cycles divided from the signal cycle 1, the sub-driving signals divided from the driving signal 210 can be sequentially outputted in the respective sub-refresh cycles; if the number of the sub-driving signals divided from the driving signal 210 is greater than the number of the sub-refresh cycles divided from the signal cycle 1, one or more sub-driving signals divided from the driving signal 210 can be outputted in one same sub-refresh cycle to distribute the output of all sub-driving signals as evenly as possible.

Figure 4:
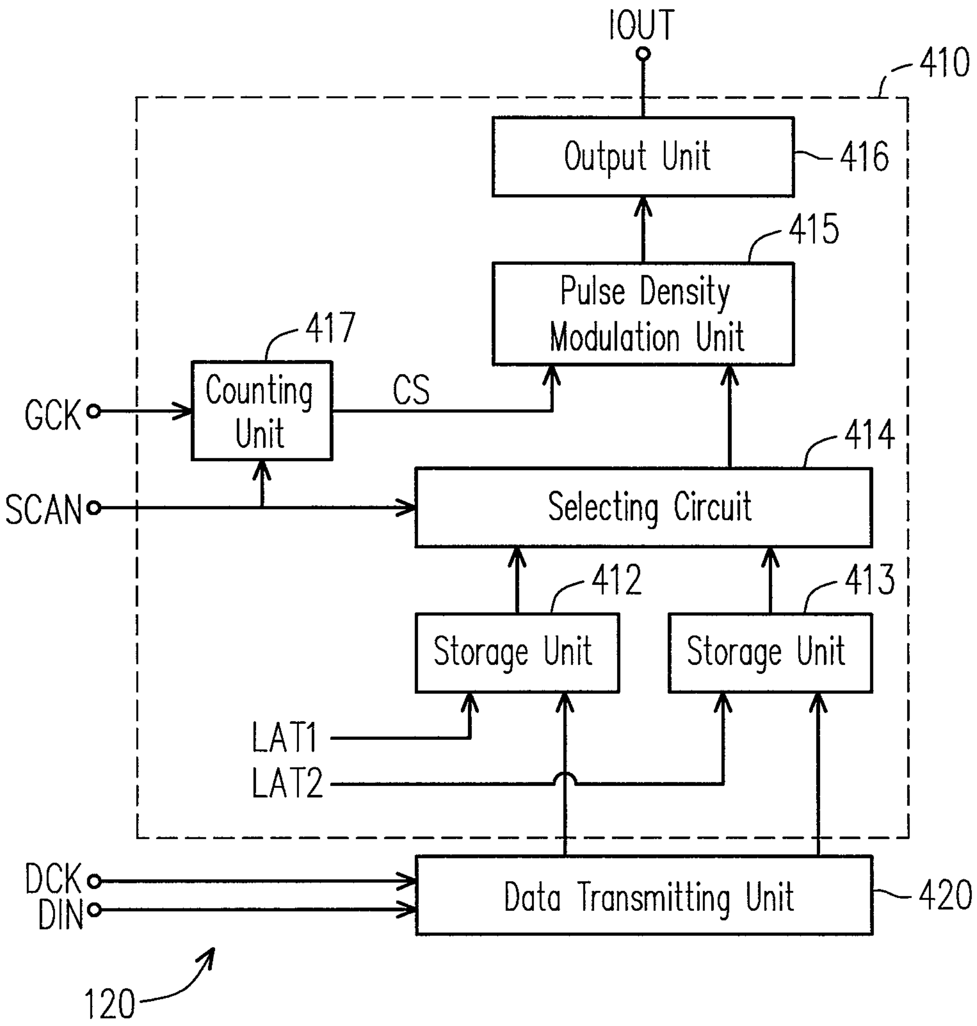
FIG. 4 illustrates a circuit block diagram of the driving circuit according to the first embodiment of the present invention.

FIG. 4 illustrates a circuit block diagram of the driving circuit 120 according to the first embodiment of the present invention. The driving circuit 120 includes a driving unit 410 and a data transmitting unit 420. The driving unit 410 is coupled to the data transmitting unit 420. The driving unit 410 includes storage units 412, 413, a selecting unit 414, a PDM unit 415, an output unit 416, and a counting unit 417. The storage units 412, 413 are coupled to the data transmitting unit 420. The selecting unit 414 is coupled to the PDM unit 415. The output unit 416 is coupled to an output of the PDM unit 415. Latch signals LAT1, LAT2 may be used to trigger the storage units 412, 413 to retrieve data in the data transmitting unit 420. The counting unit 417 is coupled to the PDM unit 415.

According to a clock signal DCK, the data transmitting unit 420 can receive and store driving data DIN. The driving data DIN includes driving data corresponding to the LED units LED1, LED2, designated as first data and second data, respectively. The first data corresponds to the driving signal 210 and the second data corresponds to the driving signal 220. The storage units 412, 413 then receive and store the first data and second data of the driving data DIN according to the latch signals LAT1, LAT2. In other words, during one image refresh cycle, the data transmitting unit 420 can transmit and store more than two pieces of LED driving data, or driving data for two LED strings. In addition, the latch signals LAT1, LAT2 may be provided by an external system or internally generated by the driving circuit 120. The present embodiment is not intended to limit the way of providing the latch signals LAT1, LAT2 to any particular implementations described herein.

The selecting circuit 414 selects one of the storage unit 412 and storage unit 413 according to a scan signal SCAN to output the first data or second data to the PDM unit 415. The counting unit 417 can output a counting signal CS to the PDM unit 415 according to a gray scale control signal GCK. The PDM unit 415 outputs a PDM signal to the output unit 416 based on the counting signal CS and the output (i.e. the first data or second data) of the selecting circuit 414. The output unit 416 generates a driving signal IOUT, i.e. driving signals 210 and 220, according to the received PDM signal.

The selecting circuit 414 selects the output of the storage unit 412 or 413 based on the arrangement of the sub-refresh cycles 1-1 to 1-4, 2-1 to 2-4. For example, the storage unit 412 is selected during the sub-refresh cycles 1-1 to 1-4, while the storage unit 413 is selected during the sub-refresh cycles 2-1 to 2-4. By adjusting the counting sequence of the counting signal CS, the PDM unit 415 can then divide the duty cycle of the outputted PDM signal into a plurality of sub-duty cycles and adjust the sequence of the sub-duty cycles. The output unit 416 outputs a sub-driving signal corresponding to the received sub-duty cycle, as shown in the driving waveform of FIG. 3. In other words, the selecting circuit 414 outputs corresponding LED driving data (i.e. first data or second data) according to the preset sequence of the sub-refresh cycles 1-1 to 1-4, 2-1 to 2-4, the PDM unit 415 then outputs the corresponding sub-duty cycles during the respective sub-refresh cycles 1-1 to 1-4, 2-1 to 2-4 according to the received LED driving data, such that the output unit 416 can output the driving signals IOUT indicated by the waveform of FIG. 3. As such, the output unit 416 can output alternate sub-driving signals to drive the LED units LED1, LED2.

It is noted that a PWM circuit is one kind of the PDM unit, the PDM unit 415 can divide a complete duty cycle into a plurality of sub-duty cycles. The PDM unit 415 includes, for example, a digital comparator such that the duty cycle can be divided into a plurality of sub-duty cycles by adjusting the bit order of the counting signal. This can be readily understood by those skilled in the art upon reading the present disclosure and thus is not described further herein.

In another embodiment of the present invention, the driving circuit 120 can include more additional storage units adapted for driving more than two LED units. The present embodiment is not intended to limit the number of the storage units to any particular embodiments described herein. The driving circuit 120 can divide one image refresh cycle into a plurality of sub-refresh cycles based on the number of the LED units and then output corresponding sub-driving signals in the respective sub-refresh cycles to alternately drive the LED units to thereby increase the image refresh rate.

Second Embodiment

Figure 5:
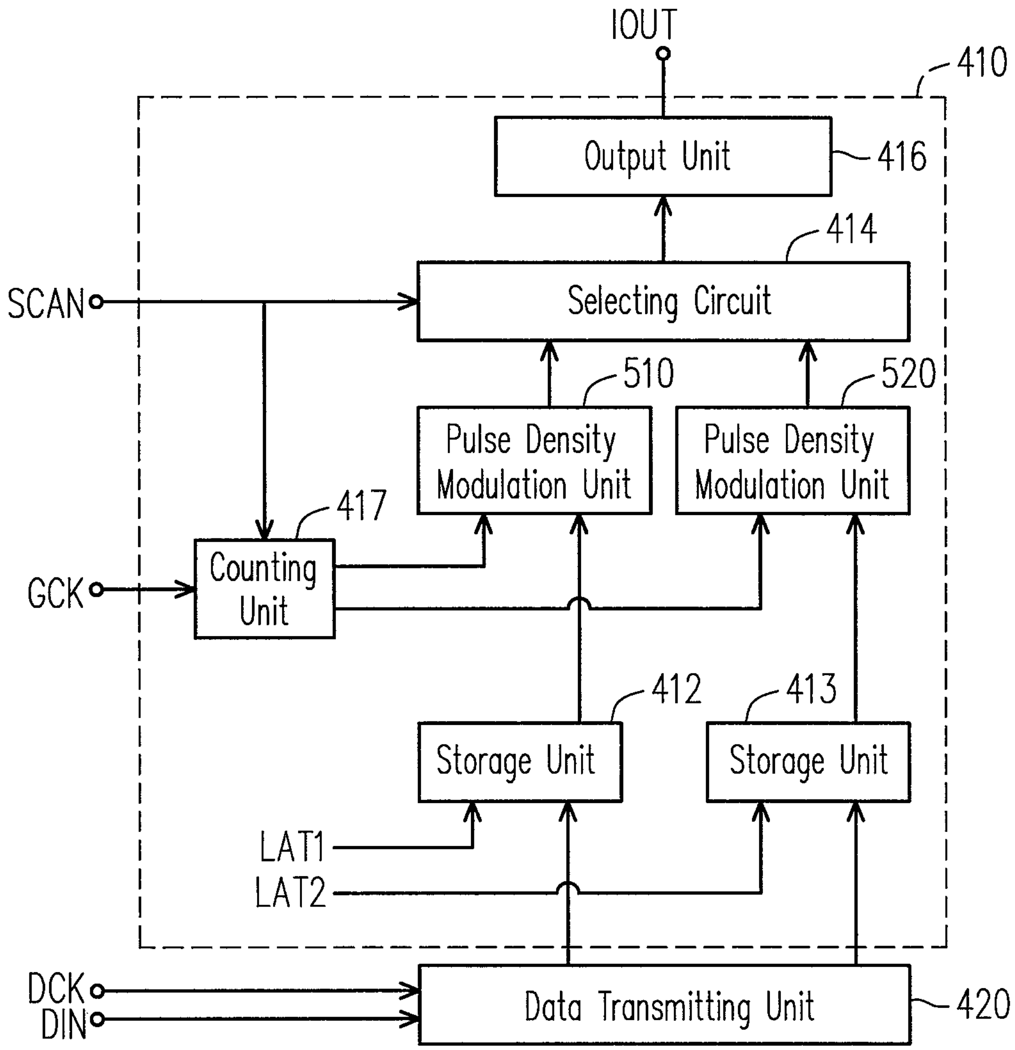
FIG. 5 illustrates a circuit block diagram of the driving circuit according to a second embodiment of the present invention.

FIG. 5 illustrates a circuit block diagram of the driving circuit according to a second embodiment of the present invention. The main difference between FIG. 5 and FIG. 4 is the circuit architecture of the PDM units 510, 520 and selecting circuit 414. The PDM units 510, 520 are coupled between the storage units 412, 413, and the selecting circuit 414, respectively. The PDM units 510, 520 first transform the first data and second data in the storage units 412, 413 into a plurality of first sub-duty cycles and a plurality of second sub-duty cycles, respectively. The selecting circuit 414 then selects the PDM unit 510 or 520 according to the arrangement of the sub-refresh cycles 1-1 to 1-4, 2-1 to 2-4, to output corresponding sub-duty cycles to the output unit 416. The output unit 416 likewise outputs the sub-driving signals 211 to 214, 221 to 224 according to the received the sub-duty cycles.

In other words, in the embodiment of FIG. 4, the driving circuit 120 selects the data source before outputting the sub-duty cycles. However, in the embodiment of FIG. 5, the driving circuit 120 first transforms the data into sub-duty cycles and then selects the output sequence. While there are slight differences between the circuit architecture of FIG. 4 and FIG. 5, they both can output alternate sub-driving signals 211 to 214, 221 to 224 to alternately drive the LED units LED1, LED2 according to the sub-refresh cycles 1-1 to 1-4, 2-1 to 204. The image refresh rate of an LED display can be increased by dividing the driving signals 210, 220 into a plurality of sub-driving signals 211 to 214, 221 to 224.

Figure 6A:
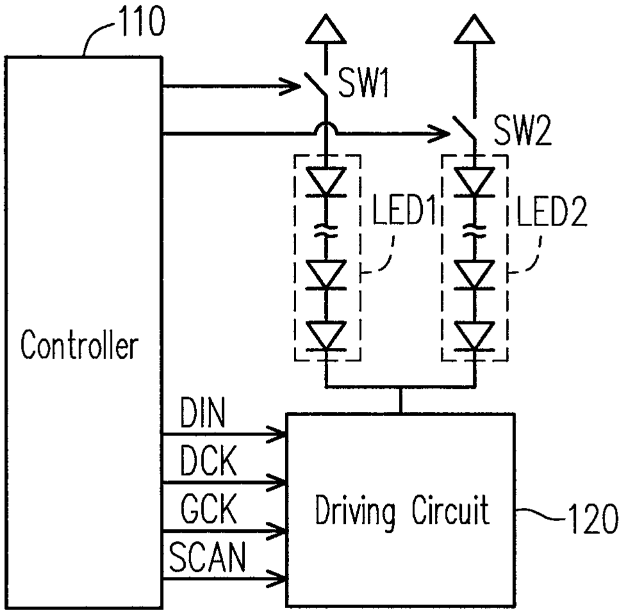
FIG. 6A illustrates a driving apparatus of a light emitting diode according to the second embodiment of the present invention.
Figure 6B:
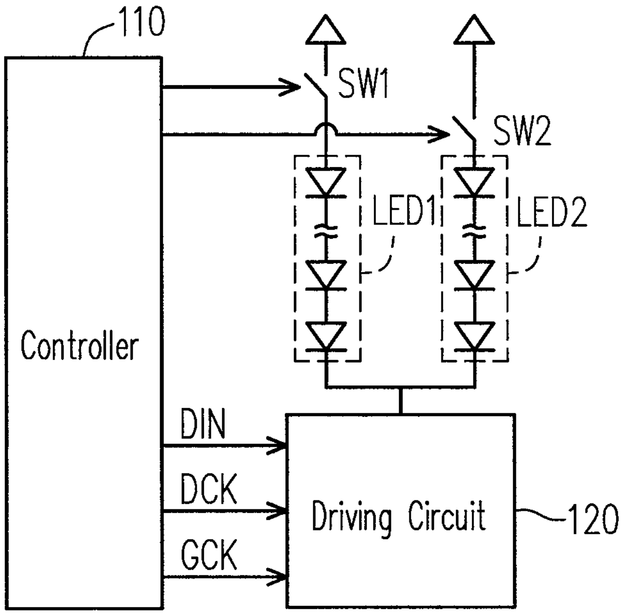
FIG. 6B illustrates a driving apparatus of a light emitting diode according to another embodiment of the present invention.
Figure 6C:
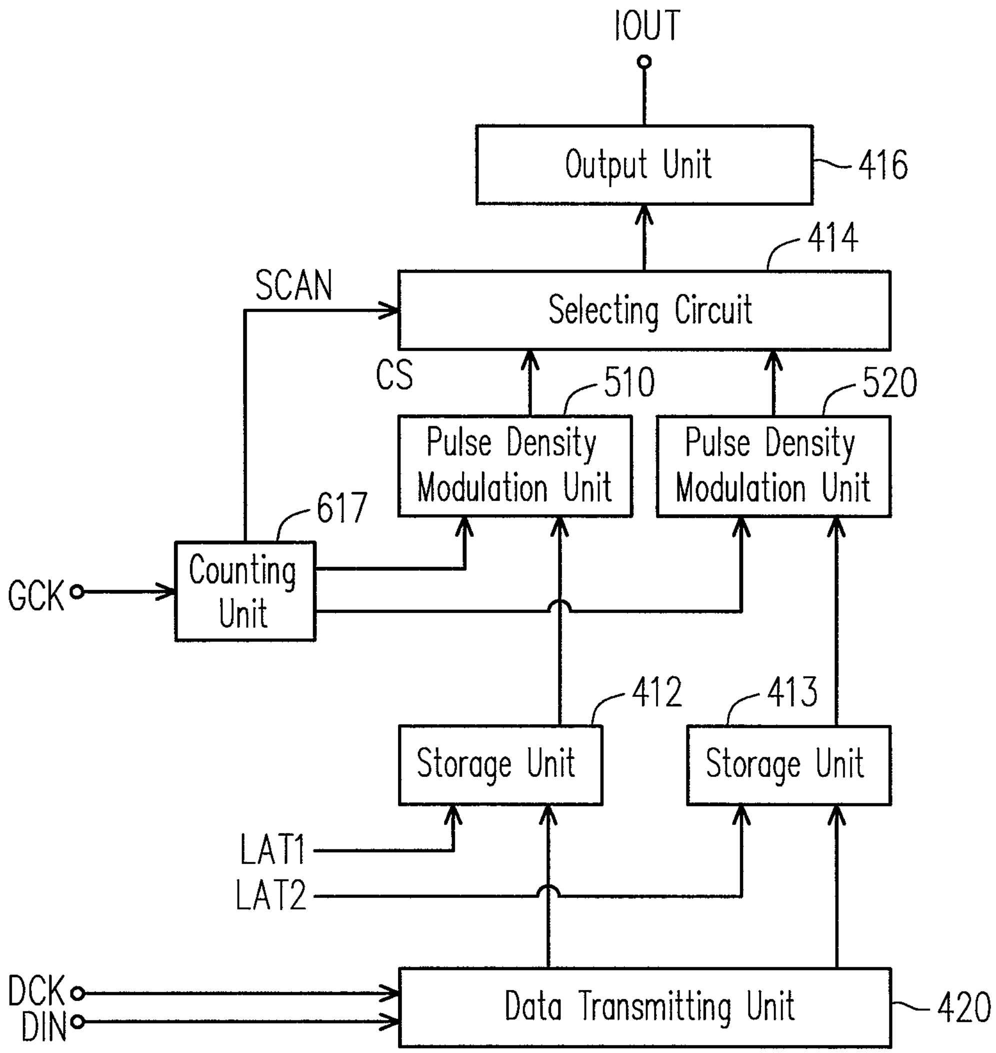
FIG. 6C illustrates circuit architecture of the driving circuit of FIG. 6B.

In addition, the driving data DIN, clock signal DCK, latch signals LAT, scan signal SCAN, and gray scale control signal GCK received by the driving circuit 120 of FIG. 4 and FIG. 5 may be provided to the driving circuit 120 from the controller 110 or from an external circuit or device. The present embodiment is not intended to limit the way of providing these data or signals to any particular implementations described herein. FIG. 6A illustrates an LED driving apparatus according to the second embodiment of the present invention, wherein the controller 110 transmits the driving data DIN, clock signal DCK, gray scale control signal GCK and scan signal SCAN to the driving circuit 120. In another embodiment of the present invention illustrated in FIG. 6B, the controller 110 transmits the driving data DIN, clock signal DCK and gray scale control signal GCK to the driving circuit 120, and the driving circuit 120 can generate a scan signal SCAN according to the gray scale control signal GCK. FIG. 6C illustrates circuit architecture of the driving circuit 120 of FIG. 6B. The main difference between the circuit architecture of FIG. 6C and FIG. 5 is that the counting unit 617 can directly generate and transmit the scan signal SCAN to the selecting circuit 414 according to the gray scale control signal GCK. This can be readily understood by those skilled in the art upon reading the present disclosure and therefore is not described further herein.

Third Embodiment

Figure 7:
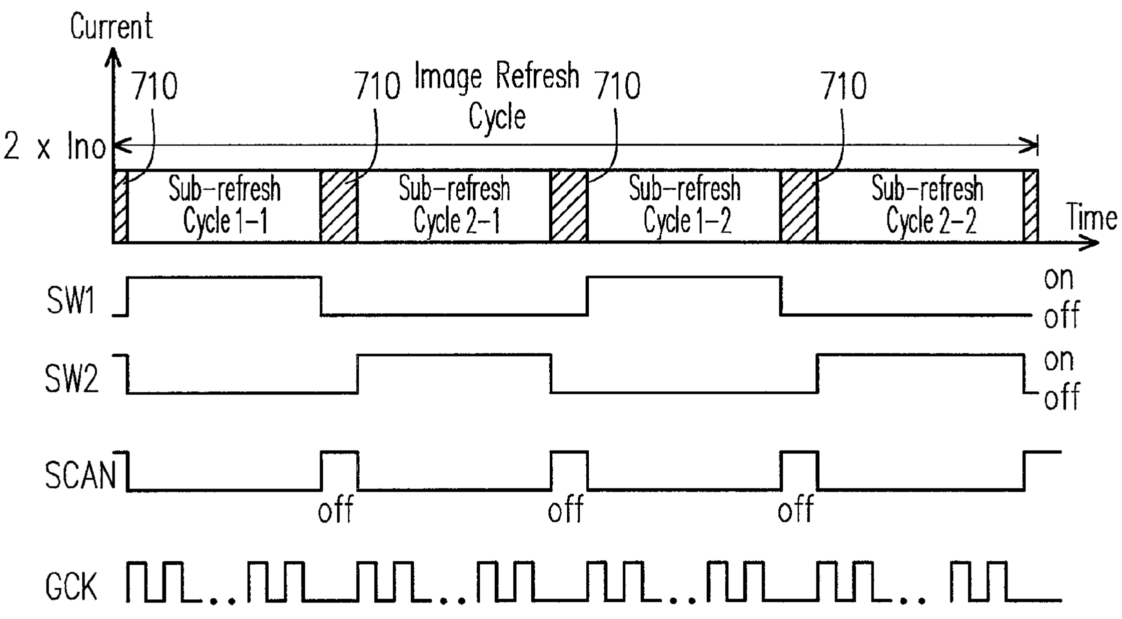
FIG. 7 and FIG. 8 illustrate image black insertion signal according to a third embodiment of the present invention.
Figure 8:
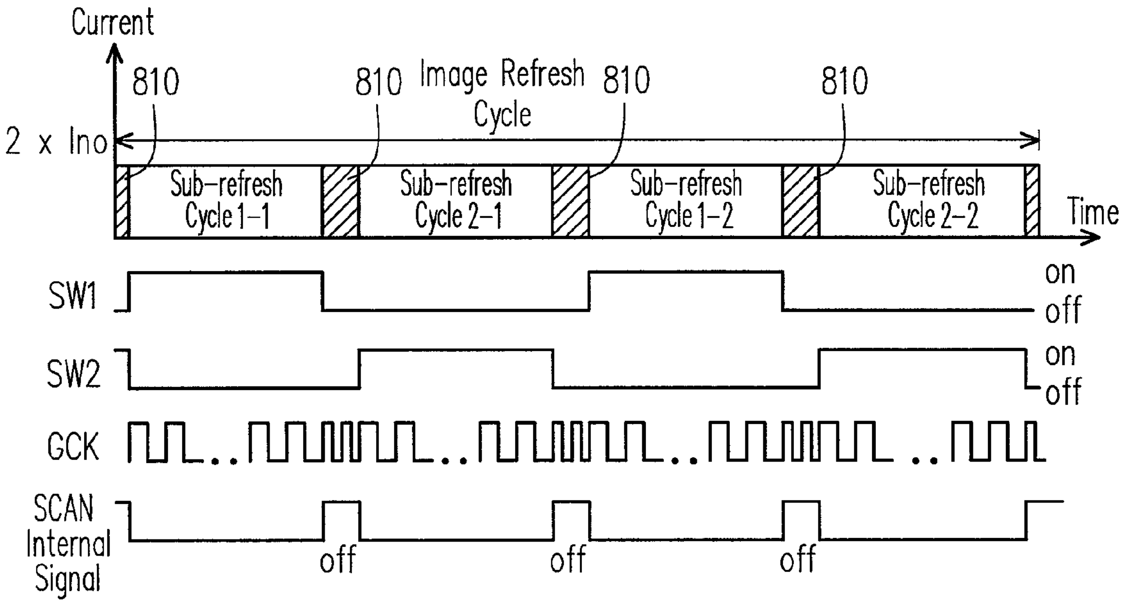

In a driving chip of the LED, the gray scale control signal GCK may be used to control the gray scale value of an image, the scan signal SCAN is used to determine the scan sequence, and the driving apparatus can directly use the gray scale control signal GCK or the scan signal SCAN to perform an image black insertion in order to improve the image persistence issue. FIG. 7 and FIG. 8 illustrate the black insertion signals according to a third embodiment of the present invention. Referring also to FIG. 1, the controller 110 can control the driving circuit 120 to output a black insertion signal by using the scan signal SCAN as illustrated in FIG. 7. The driving apparatus inserts a black image 710 between adjacent sub-refresh cycles (e.g. sub-refresh cycle 1-1 and sub-refresh cycle 2-1). This black image is generated by means of enabling of the scan signal SCAN. When the driving circuit 120 receives a scan signal SCAN waveform (e.g. when the level of scan signal SCAN is high) indicative of black insertion, the driving circuit 120 outputs a black insertion signal to produce a black image 710. Referring to FIG. 8, which illustrates the black insertion signal according to another embodiment of the present invention, the controller 110 can control the driving circuit 120 to output a black signal to produce a black image 810 by using the gray scale control signal GCK. This black image 810 is generated by mean of enabling of the gray scale control signal GCK of a particular waveform. The enabling waveform can be determined upon actual requirements and is not intended to be limited to any particular embodiment of FIG. 8. When the driving circuit 120 receives a gray scale control signal GCK waveform indicative of black insertion, the driving circuit 120 outputs a black insertion signal (e.g. gray scale 0) to produce the black image 810. The gray scale control signal GCK may be adapted for, for example, the driving circuit of FIG. 6C wherein the counting unit 617 may generate an internal scan signal SCAN according to the gray scale control signal GCK, causing the selecting unit 414 to stop outputting driving data, such that the output unit 416 outputs a black signal. The waveform of the gray scale control signal GCK for black insertion is not limited to the waveform of FIG. 8. In another embodiment, the waveform for black insertion may consist of two pulses with a short cycle.

It is noted, however, that the black insertion signal can be generated in a different manner. For example, the black insertion signal can be generated by disabling the driving circuit 120, which can be readily understood by those skilled in the art upon reading the present disclosure and there is not described further herein.

Fourth Embodiment

Figure 9:
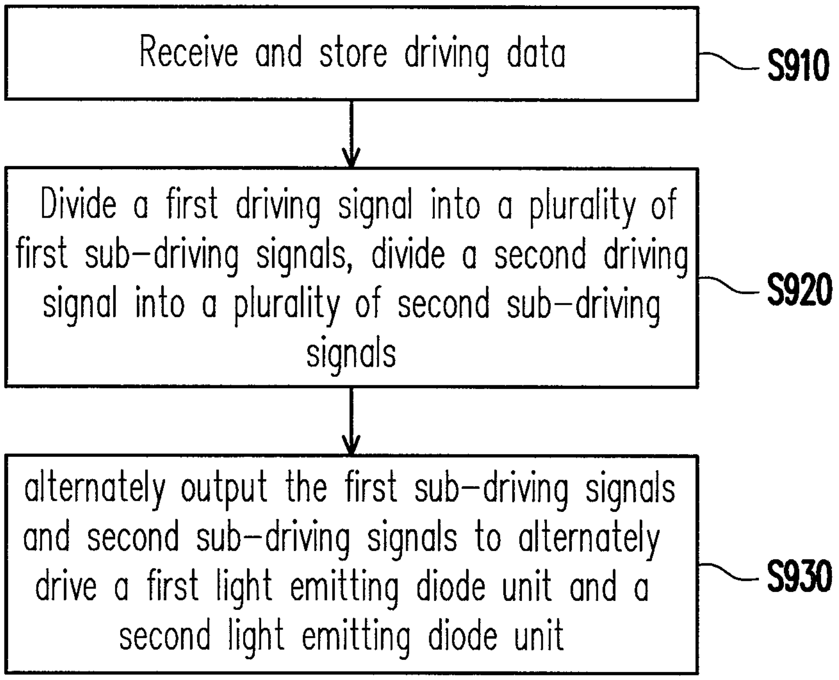
FIG. 9 illustrates a driving method for a light emitting diode unit according to a fourth embodiment of the present invention.

A method for driving an LED can be concluded from the above embodiments. FIG. 9 illustrates a method for driving an LED according to a fourth embodiment of the present invention, adapted for driving at least a first LED unit and a second LED unit. Driving data is firstly received, which includes first data corresponding to a first driving signal and second data corresponding to a second driving signal. The first data and second data correspond to different LED units (e.g. LED string) (step 910). Then, the first driving signal is divided into a plurality of first sub-driving signals and the second driving signal is divided into a plurality of second sub-driving signals (step S920). The first sub-driving signals and the second sub-driving signals are alternately outputted to alternately driving the first LED unit and the second LED unit (step S930).

The first driving signal and the second driving signal may be divided in a manner as shown in FIG. 2, and the first sub-driving signals and the second sub-driving signals may be outputted in a sequence as shown in FIG. 3. For details of remaining operations of the present driving method, the first to fourth embodiments described above may be referred and therefore are not repeated herein.

In summary, in the present invention, the LED driving signal is divided into a plurality of sub-driving signals and then the plurality of sub-driving signals are alternately outputted to alternately output two or more LED units to thereby increase the image refresh rate.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A driving apparatus for driving a first LED string and a second LED string, wherein the first LED string is connected to a first switch and the second LED string is connected to a second switch for alternatively driving the first LED string and the second LED string, the driving apparatus comprising:

a data transmitting unit for receiving and storing driving data, the driving data comprising a first portion for driving the first LED string and a second portion for driving the second LED string; and a driving unit coupled to the data transmitting unit, wherein the driving unit comprises a single node to output a first plurality of groups of driving signals to drive the first LED string according to the first portion of the driving data and a second plurality of groups of driving signals to drive the second LED string according to the second portion of the driving data;

wherein the first plurality of groups of driving signals respectively drive the first LED string in a first plurality of time intervals in which the first switch is on, and the second plurality of groups of driving signals respectively drive the second LED string in a second plurality of time intervals in which the second switch is on, wherein the first plurality of groups of driving signals are interleaved with the second plurality of groups of driving signals and the interleaved signals are outputted through the single node to drive the first LED string and the second LED string.

2. The driving apparatus according to claim 1, wherein a refresh cycle of the first LED string is divided into a first plurality of sub-refresh cycles and a refresh cycle of the second LED string is divided into a second plurality of sub-refresh cycles, wherein sub-refresh cycles of the first LED string are interleaved with the sub-refresh cycles of the second LED string; and the single node of the driving unit respectively outputs the first plurality of groups of driving signals to the first LED string during the first plurality of sub-refresh cycles and respectively outputs the second plurality of groups of driving signals to the second LED string during the second plurality of sub-refresh cycles.

3. The driving apparatus according to claim 2, wherein the first plurality of sub-refresh cycles and the second plurality of sub-refresh cycles are interleaved to each other cycle by cycle.

4. The driving apparatus according to claim 1, wherein the driving unit further comprises:

a first storage unit coupled to the data transmitting unit for storing the first portion of driving data; and a second storage unit coupled to the data transmitting unit for storing the second portion of driving data.

5. The driving apparatus according to claim 4, wherein the driving unit further comprises:

a selecting circuit coupled to the first storage unit and the second storage unit for selectively outputting the first portion of driving data or the second portion of driving data;

a pulse density modulation unit coupled to the output of the selecting circuit for generating a plurality of sub-duty cycles according to the output of the selecting circuit and a counting signal;

an output unit coupled to the pulse density modulation unit for generating the first plurality of groups of driving signals and the second plurality of groups of driving signals according to the plurality of sub-duty cycles; and a counting unit coupled to the pulse density modulation for outputting the counting signal.

6. The driving apparatus according to claim 4, wherein the driving unit further comprises:

a first pulse density modulation unit coupled to the first storage unit for outputting a first plurality of sub-duty cycles according to the first portion of driving data and a first counting signal;

a second pulse density modulation unit coupled to the second storage unit for outputting a second plurality of sub-duty cycles according to the second portion of driving data and a second counting signal;

a selecting unit coupled to the first pulse density modulation unit and the second pulse density modulation unit for selectively outputting the first plurality of sub-duty cycles or the second plurality of sub-duty cycles;

an output unit coupled to the selecting unit for generating the first plurality of groups of driving signals according to the first plurality of sub-duty cycles and generating the second plurality of groups of driving signals according to the second plurality of sub-duty cycles; and a counting unit coupled to the first pulse density modulation unit and the second pulse density modulation unit for outputting the first counting signal and the second counting signal, respectively.

7. The driving apparatus according to claim 1, wherein the first switch is coupled between one end of the first LED string and an operating voltage; and the second switch is coupled between one end of the second LED string and the operating voltage, further comprising a controller coupled to the first switch, the second switch, the data transmitting unit and the driving unit for controlling turn-on/off of the first switch and the second switch.

8. The driving apparatus according to claim 1, wherein the first switch is coupled between one end of the first LED string and the driving unit, wherein the other end of the first LED string is coupled to an operating voltage; and the second switch is coupled between one end of the second LED string and the driving unit, wherein the other end of the second LED string is coupled to the operating voltage, further comprising a controller coupled to the first switch, the second switch, the data transmitting unit and the driving unit for controlling turn-on/off of the first switch and the second switch.

9. The driving apparatus according to claim 1, wherein the driving unit is adapted to output a black insertion signal between each two adjacent groups of driving signals for driving the first LED string and the second LED string.

10. The driving apparatus according to claim 1, wherein the first LED string and the second LED string comprises N and M light emitting diodes connected in series, respectively, N and M being positive integer.

11. The driving apparatus according to claim 1, wherein the data transmitting unit and the driving unit are integrated into one driving circuit.

12. A method for driving a light emitting diode, adapted for driving a first LED string and a second LED string, wherein the first LED string is connected to a first switch and the second LED string is connected to a second switch for alternatively driving the first LED string and the second LED string, the method comprising:

receiving and storing driving data, the driving data comprising a first portion for driving the first LED string and a second portion for driving the second LED string; and providing a single node to output a first plurality of groups of driving signals to drive the first LED string according to the first portion of the driving data and a second plurality of groups of driving signals to drive the second LED string according to the second portion of the driving data, wherein the first plurality of groups of driving signals respectively drive the first LED string in a first plurality of time intervals in which the first switch is on, and the second plurality of groups of driving signals respectively drive the second LED string in a second plurality of time intervals in which the second switch is on, wherein the first plurality of groups of driving signals are interleaved with the second plurality of groups of driving signals and the interleaved signals are outputted through the single node to drive the first LED string and the second LED string.

13. The driving method according to claim 12, further comprising:

dividing a refresh cycle of the first LED string into a first plurality of sub-refresh cycles and a refresh cycle of the second LED string into a second plurality of sub-refresh cycles that are alternately arranged, and the single node respectively outputting the first plurality of groups of driving signals during the first plurality of sub-refresh cycles and respectively outputting the second plurality of groups of driving signals during the second plurality of sub-refresh cycles.

14. The driving method according to claim 13, wherein the first plurality of sub-refresh cycles and the second plurality of sub-refresh cycles are interleaved to each other cycle by cycle.

15. The driving method according to claim 12, further comprising:

outputting a black insertion signal between each two adjacent groups of driving signals for driving the first LED string and the second LED string.

* * * * *